United States Patent [19]

Davis

[11] Patent Number: 4,758,029
[45] Date of Patent: Jul. 19, 1988

[54] SEGMENTED FITTING FOR CONVOLUTED HOSE

[75] Inventor: Bryon C. Davis, Jackson, Mich.

[73] Assignee: Aeroquip Corporation, Jackson, Mich.

[21] Appl. No.: 61,274

[22] Filed: Jun. 12, 1987

[51] Int. Cl.$^4$ .............................................. F16L 33/22
[52] U.S. Cl. .................................... 285/253; 285/259
[58] Field of Search ............... 285/243, 253, 149, 256, 285/259, 903

[56] References Cited

U.S. PATENT DOCUMENTS

| | | | |
|---|---|---|---|
| 746,497 | 12/1903 | Greenfield | 285/149 |
| 1,587,327 | 6/1926 | Johnson | 285/253 X |
| 1,802,499 | 4/1931 | Chapman | 285/253 |
| 3,185,500 | 5/1965 | Luther | 285/256 X |
| 4,369,992 | 1/1983 | Fournier et al. | 285/903 X |
| 4,593,942 | 6/1986 | Loker | 285/253 |

FOREIGN PATENT DOCUMENTS 1558575  2/1969  France .................................. 285/243

OTHER PUBLICATIONS

Aeroquip, "Reusable Fittings for Use with Hose FC132,2580", p. 104.
Aeroquip, "Reusable Fittings for Use with Hose 2580", p. 96.

Primary Examiner—Dave W. Arola
Attorney, Agent, or Firm—Beaman & Beaman

[57] ABSTRACT

A fitting for convoluted tetrafluoroethylene hose wherein all of the fitting components are reusable. The fitting includes a tubular nipple inserted into the end of the convoluted hose, and the outer nipple end includes conduit attachment structure. Ridges and serrations defined on the nipple within the hose aid sealing, and a segmented socket of at least three segments interconnected by bolts compress the hose on the nipple. The fitting utilizes conventional cap screws, and permits field assembly and disassembly without special apparatus, and the configuration of the fitting produces a concise low profile.

5 Claims, 1 Drawing Sheet

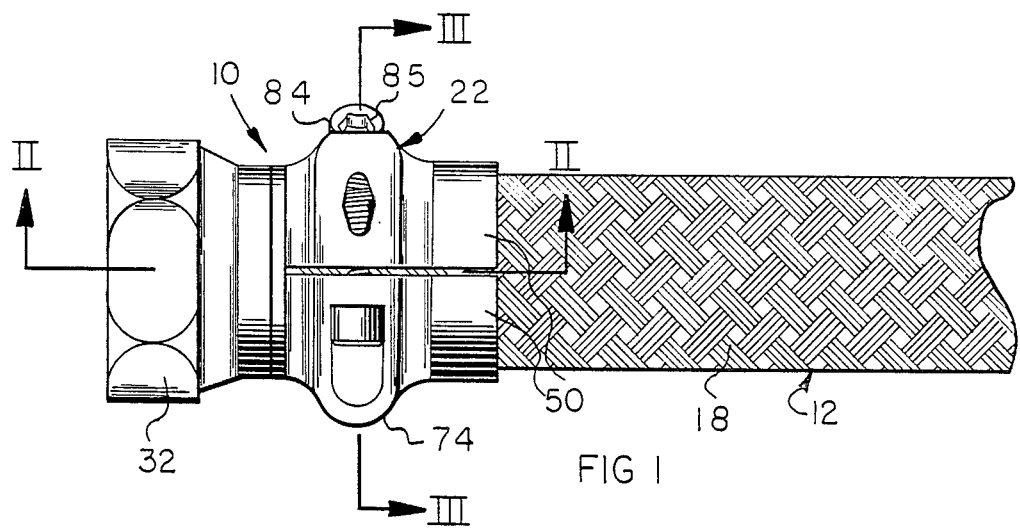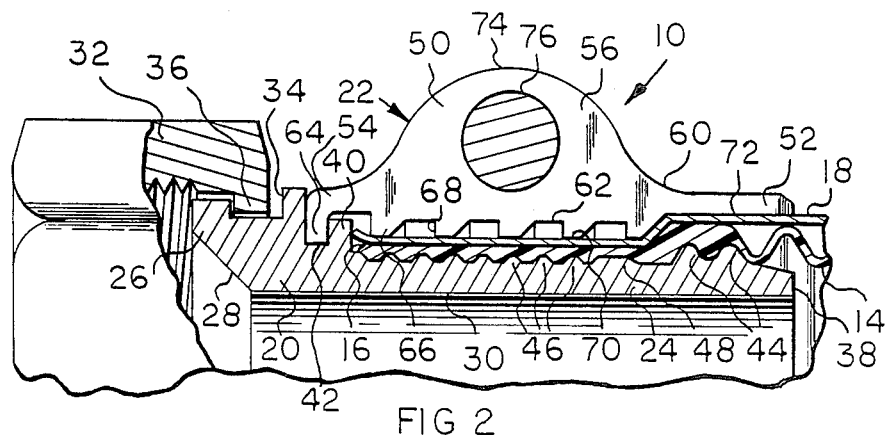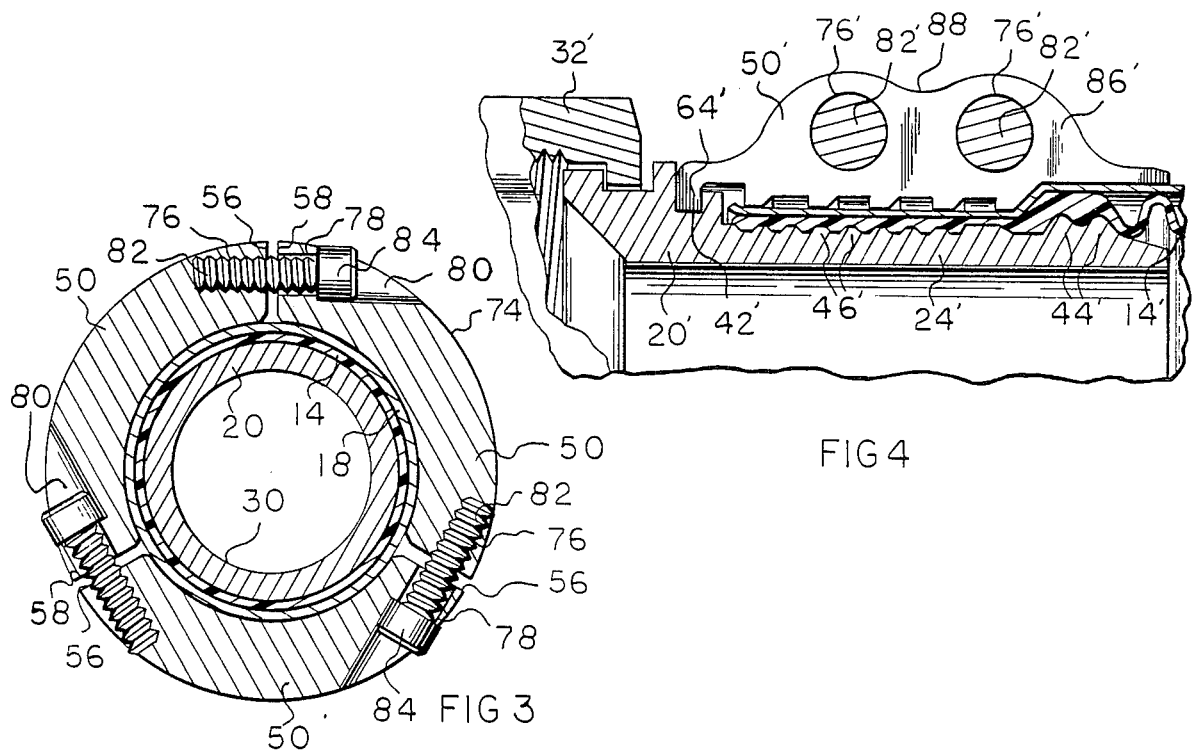

SEGMENTED FITTING FOR CONVOLUTED HOSE

BACKGROUND OF THE INVENTION

Tetrafluoroethylene hose is used in adverse applications wherein high resistance to temperature and chemical deterioration is necessary. Tetrafluoroethylene hose is increasingly employed in a wider variety of applications, and when the highest flexibility and resistance to flexing is desired, convoluted tetrafluoroethylene hose is utilized.

In the past, due to the characteristics of tetrafluoroethylene, hose end fittings of the reusable type were not usually employed. Rather, fittings employing swaged sockets are used to insure the necessary pressures required to produce efficient sealing. Such permanently mounted swaged end fittings require extensive hose inventories, and there has long been a need for a reusable fitting for use with convoluted tetrafluoroethylene hose which does not require special assembl apparatus, or unusual assembly skills.

It is an object of the invention to provide a fitting for convoluted tetrafluoroethylene hose wherein the fitting and components are reusable and may be assembled upon the hose without special skills thereby significantly minimizing hose and hose fitting inventories.

Yet another object of the invention is to provide a reusable fitting for tetrafluoroethylene hose of the convoluted type wherein effective sealing between the fitting and hose is readily accomplished, and sufficient mechanical interconnection therebetween is provided to resist fitting "blow off" under operating pressures.

Yet another object of the invention is to provide a reusable usable fitting for convoluted tetrafluoroethylene hose wherein the fitting components may be readily manufactured, and include a segmented socket for producing high radial sealing forces for compressing the hose upon a nipple, and wherein conventional tools may be employed by the installer permitting field assembl and disassembly.

A further object of the invention is to provide a fitting for convoluted tetrafluoroethylene hose utilizing a segmented socket wherein the fitting has a low profile and is of a concise configuration to meet aesthetic, safety and clearance conditions.

In the practice of the invention the fitting includes a tubular nipple having an inner end which is received within the bore of a convoluted tetrafluoroethylene hose. The outer end of the nipple is provided with conduit attachment structure, such as a nut.

The nipple inner end includes at least one annular ridge adapted to be received within a hose configuration, and a plurality of annular serrations are defined upon the nipple exterior surface for engagement with the hose interior surface. Also, the nipple is provided with a shoulder located adjacent the end of the hose forming a groove for receiving socket retention structure.

A segmented socket is mounted upon the nipple circumscribing the hose in radial alignment with the nipple inner end and threaded cap screws are used to radially compress the socket segments which consists of at least three identical cylindrical portion components. Cap screws circumferentially oriented to the annular configuration of the fitting interconnect adjacent socket segments for contracting the assembled socket and establishing a sealed relationship between the nipple inner end and hose by compression.

The socket segments are formed with a rounded protrusion of low profile which provides high strength characteristics and the cap screws are located within the maximum diametrical dimension of the protrusions in counterbored recesses and do not add significantly to the fitting diameter and profile permitting the fitting to be employed in concise locations.

BRIEF DESCRIPTION OF THE DRAWINGS

The aforementioned objects and advantages of the invention will be appreciated from the following description and accompanying drawings wherein:

FIG. 1 elevational view of a reusable fitting for convoluted hose incorporating the concepts of the invention as assembled to a hose, FIG. 2 is an enlarged, detail, elevational, sectional view as taken along Section II—II of FIG. 1, FIG. 3 is an enlarged, elevational, sectional view as taken through the segment cap screws along Section III—III of FIG. 1, and FIG. 4 is a view similar to FIG. 2 illustrating an embodiment of the invention employing a pair of cap screws with each socket segment.

DESCRIPTION OF THE PREFERRED EMBODIMENTS

In the drawings the fitting is generally indicated at 10, while the hose is indicated at 12. A typical form of convoluted hose consists of an inner liner or layer 14 of tetrafluoroethylene wherein the convolutions may be annular and non-spiraled, or may be spirally related, to produce a plurality of V-shaped configurations. The end of the hose is indicated at 16, and in most cases an outer layer or cover 18 will circumscribe the hose to protect the inner liner. In the disclosed hose the outer cover 18 consists of a braided wire sheath as is commonly used in the pressurized hose art. The particular type of convoluted tetrafluoroethylene hose which is employed with the fitting does not form a part of the invention.

The fitting 10 consists of a nipple 20 and a socket generally indicated at 22 which circumscribes the inner end of the nipple located within the hose for compressing the hose thereon.

The nipple includes an inner end 24 of tubular configuration adapted to be inserted into the end of the hose 12. The nipple also includes an outer end 26 having a conical surface 28 concentric to the nipple bore 30 for cooperation with another fluid conduit fitting, not shown, to which the fitting 10 is attached by the nut 32 rotatably mounted upon the nipple outer end 26 by means of nipple groove 34 and nut shoulder 36 as is commonly used with hydraulic fittings.

The nipple 20 includes an inner terminating end 38, and a radially extending annular shoulder 40 is disposed adjacent the end 16 of the hose when the hose is inserted upon the nipple. An annular groove 42 formed in the nipple adjacent the shoulder 40 cooperates with inwardly defined projections formed on the socket segments for retaining and positioning the socket relative to the nipple, as later described.

The nipple 20 includes a plurality of annular ridges 44 of an enlarged configuration adjacent end 38. The ridges will be in the form of a pair of spiraled projections substantially conforming to the spiral configuration of the hose convolutions if a spiraled hose convolution configuration is employed. If the hose convolutions are not of the spiraled form but are annular in shape, the ridges 44 are then, preferably, of a non-spiraled configuration to match the hose convolutions. Intermediate the ridges 44 and the shoulder 40 a plurality of annular serrations are defined on the outer surface of the nipple inner end for cooperating with the inner surface of the hose inner liner 14. The serrations include an enlarged serration 48 of greater axial length than the identical evenly spaced serrations 46, and the serrations are preferably formed with cylindrical surface ends to prevent cutting of the hose inner layer The presence of the ridges 44, if of a spiraled configuration, permits the nipple inner end 24 to be inserted into the end of the hose 12 by rotating the nipple relative to the hose, and if the ridges and hose are of a non-spiraled form, a nonrotative axial relative movement between the nipple and hose will permit the nipple inner end to be inserted into the hose to the extent shown in FIG. 2.

The socket 22 is formed of a plurality of identical segments 50. In the illustrated embodiment three segments 50 are illustrated, but four or more segments may be used, particularly with larger diameter fittings and hose. At least three segments are preferable in that use of only two segments prevents uniform circumferential compressive forces to be applied to the hose.

Each of the segments 50 includes an inner end 52, an outer end 54, parallel lateral edges 56 and 58, an outer surface 60 and an inner surface 62. The outer end 54 is provided with an inwardly deflected projection or tongue 64 adapted to be closely received within the nipple groove 42 wherein the segments 50 will be locked to the nipple and prevented from relative axial displacement thereto. The inner surface 62 is provided with a plurality of serrations 66 including transverse shoulders 68 perpendicularly related to the axis of the nipple, and flat cylindrical terminating surfaces 70. The serrations 66 will be disposed in opposed radial relationship to the nipple serrations 46 as appreciated in FIG. 2.

The segment inner surface 62 also includes an enlarged cylindrical portion 72 in radial alignment with the ridges 44 to prevent undue thinning and compression of the hose material in the region of the segment inner end 52 to minimize the likelihood of hose failure due to flexing adjacent the fitting.

The segments' outer surface 60 is of a configuration which will be appreciated from FIGS. 1, 2 and 4 including a protrusion 74 located between ends 52 and 54 forming a rounded convex configuration of a relatively low profile, and yet a substantial radial thickness of the material of the metal socket segment is present. Each of the socket segments is provided with a tangential or circumferentially extending threaded bore 76 centrally located with respect to the protrusion as shown in FIG. 2, and the threaded bore intersects the associated segment lateral edge 56. Likewise, each segment lateral edge 58 is intersected by a smooth bore 78 terminating in a counterbore portion 80, and the bores 76 and 78 of opposed edges are aligned with each other when the segments 50 are properly oriented on the nipple as shown in FIGS. 1 and 2. Thereupon, threaded cap screws 82 may be inserted through the bores 78 for threading into the bores 76 to assemble and interconnect adjacent socket segments. The counterbores 80 are of a diameter to closely receive the cap screw heads 84, which include Allen wrench-receiving recess 85 of conventional nature.

As assembly of the fitting 10 to the hose 12 requires that the nipple inner end 24 be inserted into the hose end 16 to the extent indicated in FIG. 2, and the socket segments 50 are assembled about the hose and to the fitting as apparent in FIG. 2 wherein the projections 64 are received within groove 42, screws 82 are inserted in bores 78 and the tightening of the cap screws will radially contract the socket segments 50 upon the hose compressing the hose intermediate the socket segents and upon the nipple inner end producing an effective mechanical and fluid-tight seal between the nipple and the hose. Thus, assembly only requires an Allen wrench, and, preferably, a vise, for holding the nipple or hose during assembly thereof.

In the event of the need for hose replacement, the fitting components may be readily disassembled from the hose and the nipple removed therefrom for reassembly upon another hose end. As the cap screws 82 are conventional, replacements may be readily obtained, and the components of the described fitting may be economically manufactured.

The embodiment of FIG. 4 illustrates components similar to those described above, and equivalent components are indicated by primed reference numerals. In the embodiment of FIG. 4 the socket segments 86 are of a configuration such that an enlarged protrusion 88 is utilized in which a pair of parallel threaded bores 76', smooth bores and counterbores are employed such that a pair of parallel cap screws 82' may be utilized with each segment for interconnection with the adjacent segment. The double cap screw fastener arrangement of FIG. 4 is employed with larger sizes of convoluted hose in order to permit increased socket segment compressive force to be achieved.

It is appreciated that various modifications to the inventive concepts may be apparent to those skilled in the art without departing from the spirit and scope of the invention.

I claim:

1. A reusable fitting for convoluted hose having a plurality of adjacent annula convolutions characterized by its ability to establish an efficient seal to the hose with a minimum of special equipment an produce a low profile free of adrupt radial surfaces comprising, in combination, a tubular nipple having a longitudinal axis, an inner end adapted to be inserted into the end of a convoluted hose and an outer end, conduit attachment means defined on said nipple outer end, socket retaining means defined on said nipple intermediate said inner and outer ends, said inner end including an annular shoulder adjacent said socket retaining means, a terminal end defining the termination of said inner end and an intermediate portion between said shoulder and said terminal end, at least one annular ridge defined on said inner end adjacent said terminal end adapted to be received within a hose convolution, a plurality of annular serrations defined on said inner end intermediate portion, a circumferentially extending socket encompassing said nipple inner end, said socket comprising at least three identical segments, each segment having an outer surface, an inner end, an outer end, a concave inner surface and lateral edges intersecting said inner and outer ends, a plurality of serrations defined on each segments' inner surface inwardly projecting therefrom, a circumferentially extending protrusion defined on each segment outer surface intermediate said segment's inner and outer ends and intersecting the associated segments' lateral edges being of a rounded convex configuration in a cross-sectional plane containing the nippled axis, and releasable fastening means within said protrusions interconnecting adjacent segments comprising a threaded bore intersecting one lateral edge of each segment, a counterbored bore intersecting the other lateral edge of each segment in opposed and aligned relationship to a threaded bore, at least one circumferentially extending threaded screw extending between adjacent segments through the adjacent opposed lateral edges thereof, said screw having a head received within said counterbored bore and a threaded stem received within the aligned threaded bore, said interconnected segments defining an annular socket circumscribing said nipple inner end having a hose mounted thereon, said segments' serrations compressing the hose upon said nipple's inner end serrations.

2. In a reusable fitting for convoluted hose as in claim 1, said socket retaining means comprising an annular groove, each of said segments including an inwardly extending projection defined thereon adjacent said segments' outer end, said segment's projections being received within said socket retaining groove.

3. In a reusable fitting for convoluted hose as in claim 1, a pair of parallel threaded bores intersecting one lateral edge of each segment, a pair of parallel counterbored bores intersecting the other lateral edge of each segment in opposed and aligned relationship to a threaded bore, a screw having a head received within each counterbored bore and a threaded stem received within the aligned threaded bore.

4. In a reusable fitting for convoluted hose as in claim 1, said segments' inner surface serrations being radially aligned with said nipple inner end serrations for compressing the hose therebetween.

5. In a reusable fitting for convoluted hose as in claim 4, said segments' inner surface including a cylindrical segment portion intersecting said segments' inner end and in radial alignment with said nipple inner end ridge for lightly compressing the hose therebetween.

* * * * *